United States Patent [19]

Thomann

[11] Patent Number: 5,026,202
[45] Date of Patent: Jun. 25, 1991

[54] SIDEWALL EXTENSION MEMBER FOR A DRAINAGE CHANNEL

[76] Inventor: Roland Thomann, Hehlstrasse 6, 8135 Langnau, Switzerland

[21] Appl. No.: 443,763

[22] Filed: Nov. 30, 1989

[30] Foreign Application Priority Data

Nov. 30, 1988 [CH] Switzerland ............ 4446/88

[51] Int. Cl.$^5$ .............................................. E01F 5/00
[52] U.S. Cl. ........................................ 404/4; 404/5; 405/118; 210/164
[58] Field of Search .............. 405/118, 119, 120; 404/2, 4, 25, 26; 210/163, 164; 52/19, 20

[56] References Cited

U.S. PATENT DOCUMENTS

| | | | |
|---|---|---|---|
| 4,121,390 | 10/1978 | Hall et al. ................... | 404/26 X |
| 4,553,874 | 11/1985 | Thomann et al. ............ | 52/169.5 X |
| 4,621,939 | 11/1986 | Thomann et al. ............ | 404/26 X |
| 4,640,643 | 2/1987 | Williams ..................... | 405/118 X |

FOREIGN PATENT DOCUMENTS

2844748 4/1979 Fed. Rep. of Germany .

OTHER PUBLICATIONS

"The Best Architects, Engineers and Contractors Go Through Channels." Polydrain, undated.
"Polydrain. Surface Drainage Made Simple." Polydrain, Sep. 1983.

Primary Examiner—Dennis L. Taylor
Attorney, Agent, or Firm—W. Thad Adams, III

[57] ABSTRACT

A sidewall extension member for use with a drainage channel system of the type characterized by a plurality of drainage channel segments of progressively greater depth adapted to be interlocked end-to-end to provide a below grade gravity feed sloping drainage run of a predetermined length, each of the channel segments comprising a pair of opposing, spaced-apart side walls, a bottom wall connecting the side walls adjacent one end thereof, and a top opening opposite the bottom wall, the side walls and the bottom wall defining a fluid carrying space therebetween and the top opening defining a fluid entrance adapted to receive a grate. The sidewall extension member includes first and second sidewall extension panels formed of a cementitious material for being positioned on and received and supported by respective side walls of the drainage channel in longitudinally extending alignment therewith. The first and second sidewall extension panels define a fully unobstructed bottom opening communicating with the top opening of the drainage channel, opposing end openings and an opposing top opening and first and second spaced-apart crossbars extending across the sidewall extension member from the first sidewall extension panel to the second sidewall extension panel to connect the first and second sidewall extension panels together into a unit.

12 Claims, 5 Drawing Sheets

SIDEWALL EXTENSION MEMBER FOR A DRAINAGE CHANNEL

The invention relates to a mounting frame for a drainage channel as described in the introductory part of claim 1.

German Patent 28 44 748 discloses a kind of drainage channel, which is provided with a channel body and a frame mounted thereon to receive a grating, whereby the frame has lateral lugs on its longitudinal sides for anchoring in the foundation.

The object of the invention is to improve a drainage channel of this type or the like so that it can be integrated in a less expensive channel system.

This object is achieved according to the invention through the use of a mounting frame with the features given in the characterizing part of claim 1.

The advantage of mounting this kind of mounting frame on a known type of drainage channel is that the corresponding construction results in a deep drainage channel that is less expensive than a hydraulically equivalent drainage channel with a single channel body having a wider opening according to the state of the art and requiring a wide and heavy grating.

Other advantageous embodiments of the invention are indicated in the dependent claims.

Example embodiments of the invention are explained in more detail using the drawing.

Figure 1:
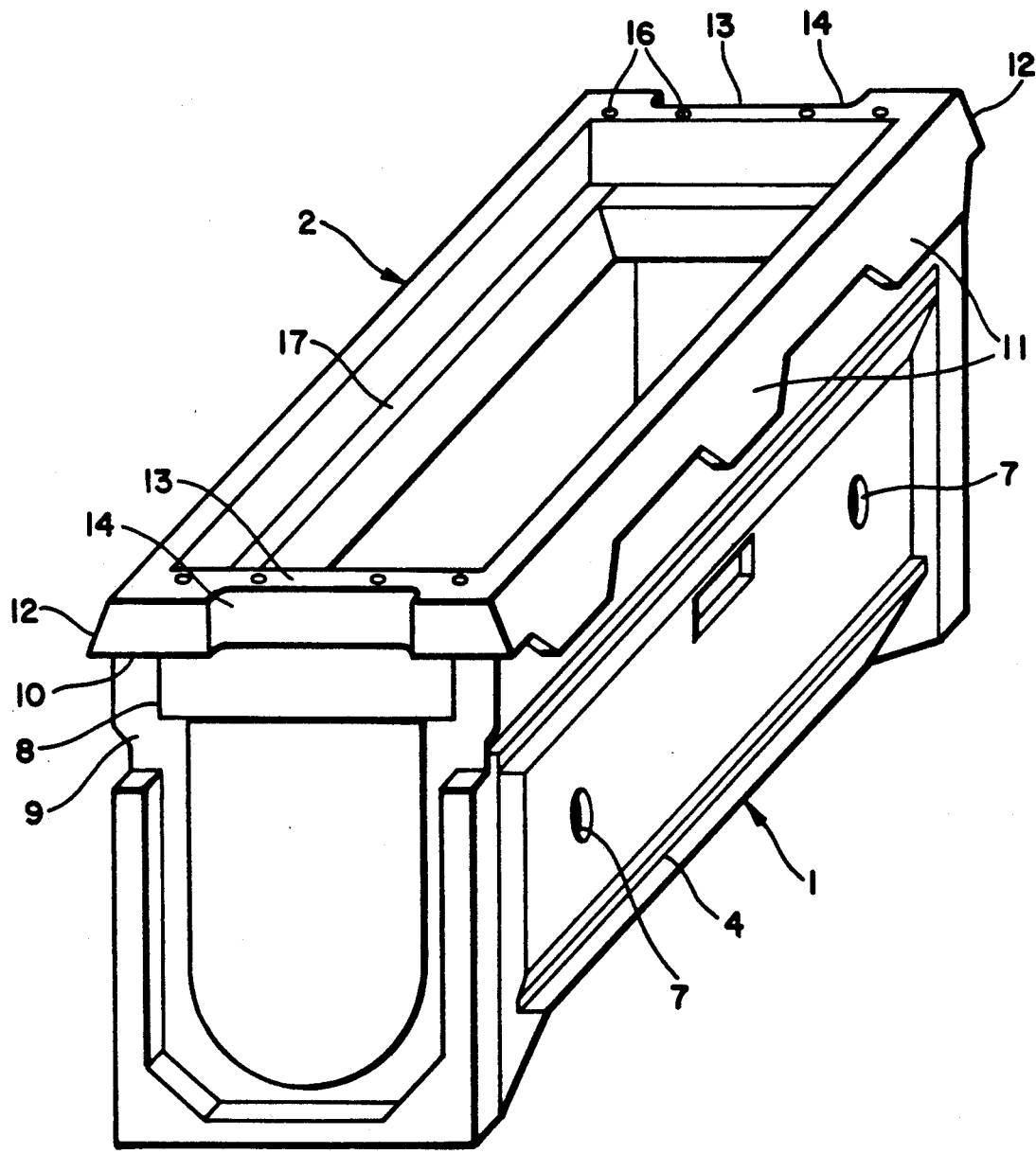
FIG. 1 is a view in perspective of a drainage channel with heavy duty frame mounted and the grating removed.

The drainage channel shown in FIG. 1 consists of a channel body 1 and a frame 2 provided to receive a cast iron grating (not shown). The channel body 1 is made of polyester concrete, for example, and has lateral projections 4 for better anchoring in the foundation. Additional anchoring can be achieved with anchoring dowels inserted in preformed cutouts 7 of the channel body 1 before laying. The top edge of the channel body 1 has supporting areas 8 for the frame 2, and it is provided on the longitudinal sides 9 of the frame with parallel rails that engage corresponding longitudinal grooves 10 of the frame 2. The outer walls of these longitudinal grooves 10 are interrupted on the outside and form three lateral lobes 11 that directly give the frame 2 a secure support. The frame 2 is provided on the outside with inclined planes 12 in order to prevent a vertical tearing out from the adjoining paving material. The two longitudinal parts of the frame can be connected to each other at their ends by crossbars 13. Arranged in the area of the crossbars 13 on the frame 2 are recesses 14, which form a slot-like opening with about the size of a grating slot when a number of frames are assembled. Short projections 16 arranged on the top of the frame and the grating hinder the tendency of the water to shoot beyond the grating.

Figure 2:
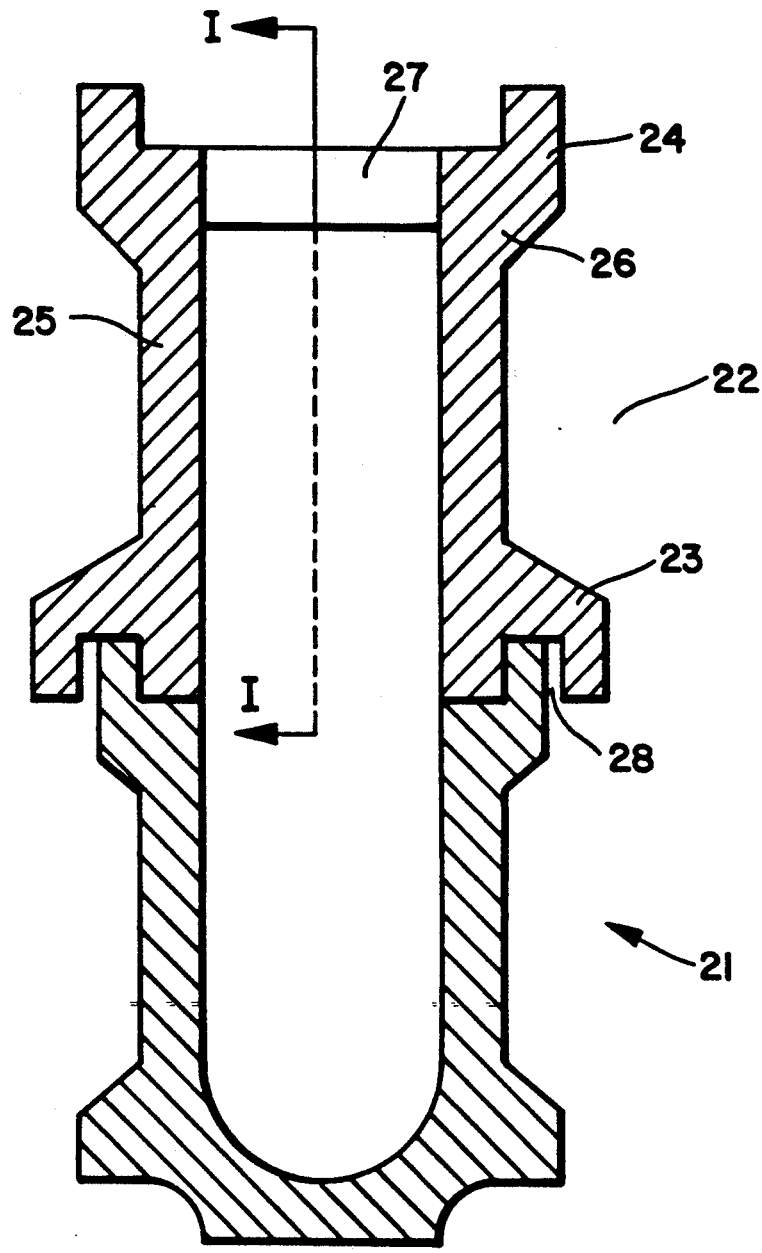
FIG. 2 is a schematic view in cross-section of a drainage channel with an invented mounting frame mounted thereon.

The mounting frame 22 shown in FIG. 2 is placed on a channel body 21 without a frame 2. The bottom part 23 of the mounting frame 22 can have the structure of the bottom part of the frame 2 according to FIG. 1, but preferably without the crossbars 13. The upper part 24 of the mounting frame 22 can, for example, have the same structure as the upper part of the channel body 1 (FIG. 1) or that of the channel body 21 (FIG. 2). The side walls 25 and 26 of the mounting frame 22 are preferably connected to each other only by two or more upper crossbars 27.

Figure 3:
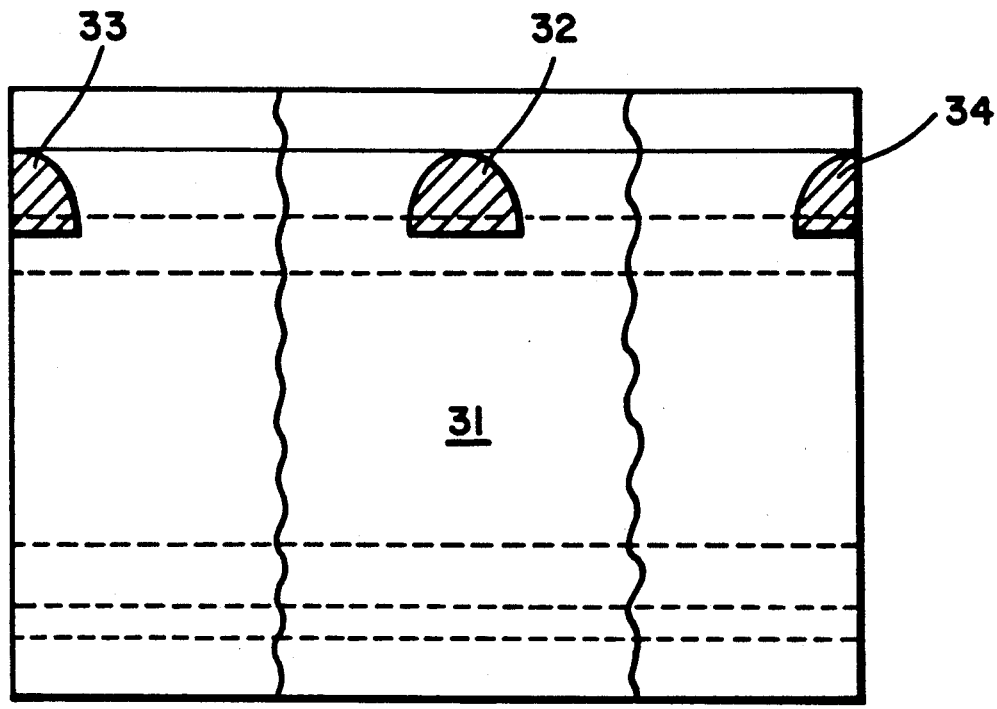
FIG. 3 is a schematic sectional view along the line I—I of FIG. 2.

FIG. 3 gives a sectional view of the connection between the inner side of a side wall 31 of the channel body 22 (FIG. 2) and three bars 32, 33, 34. The bars 33 and 34 are located on the ends of the channel body so that their cross-section has the shape of a quadrant or a quarter ellipse, for example. The center bar 32, on the other hand, has a cross-section in the form of a semicircle or a semiellipse. The rounding of the bars 32, 33, 34 is directed upward to facilitate the flow of the water. The bars can also be pointed or triangular in shape.

Figure 4:
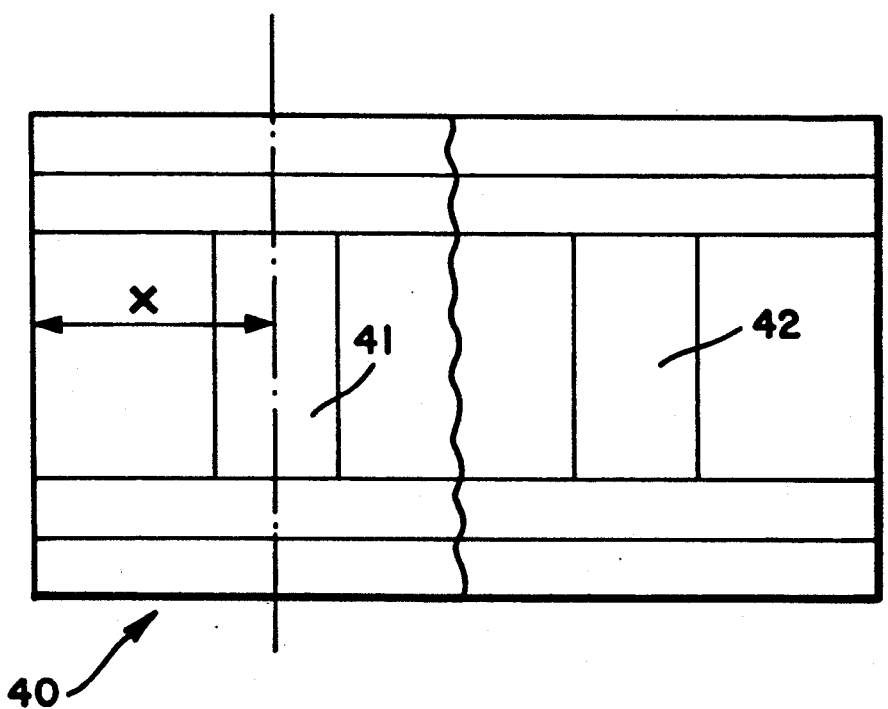
FIG. 4 is a plan view of the drainage channel.
Figure 5:
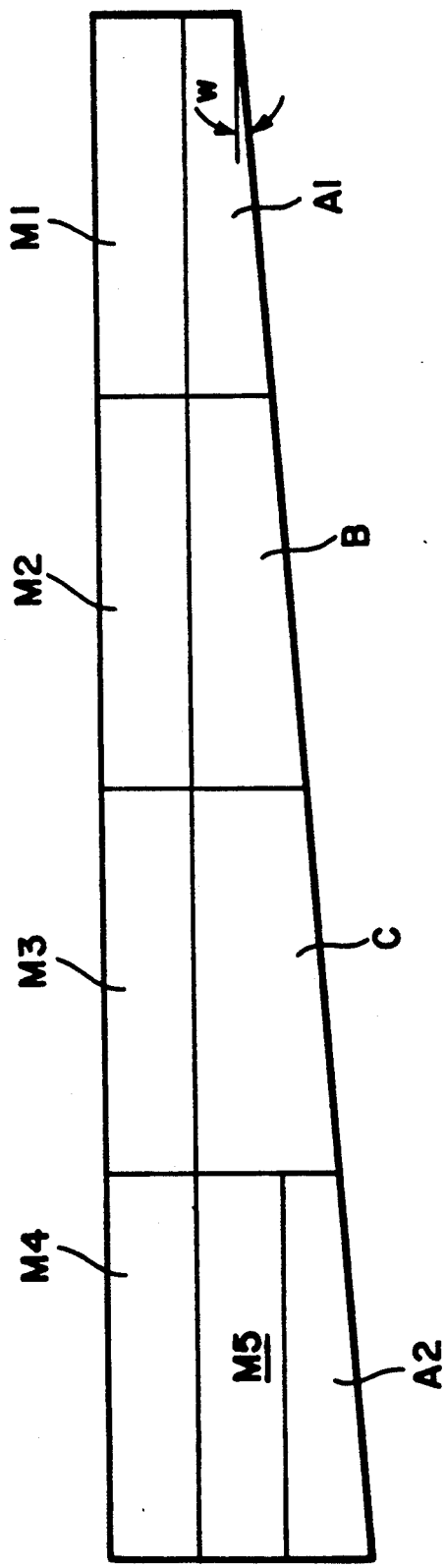
FIG. 5 is a schematic view of a number of mounting frames each mounted in segments on a drainage channel.
Figure 6:
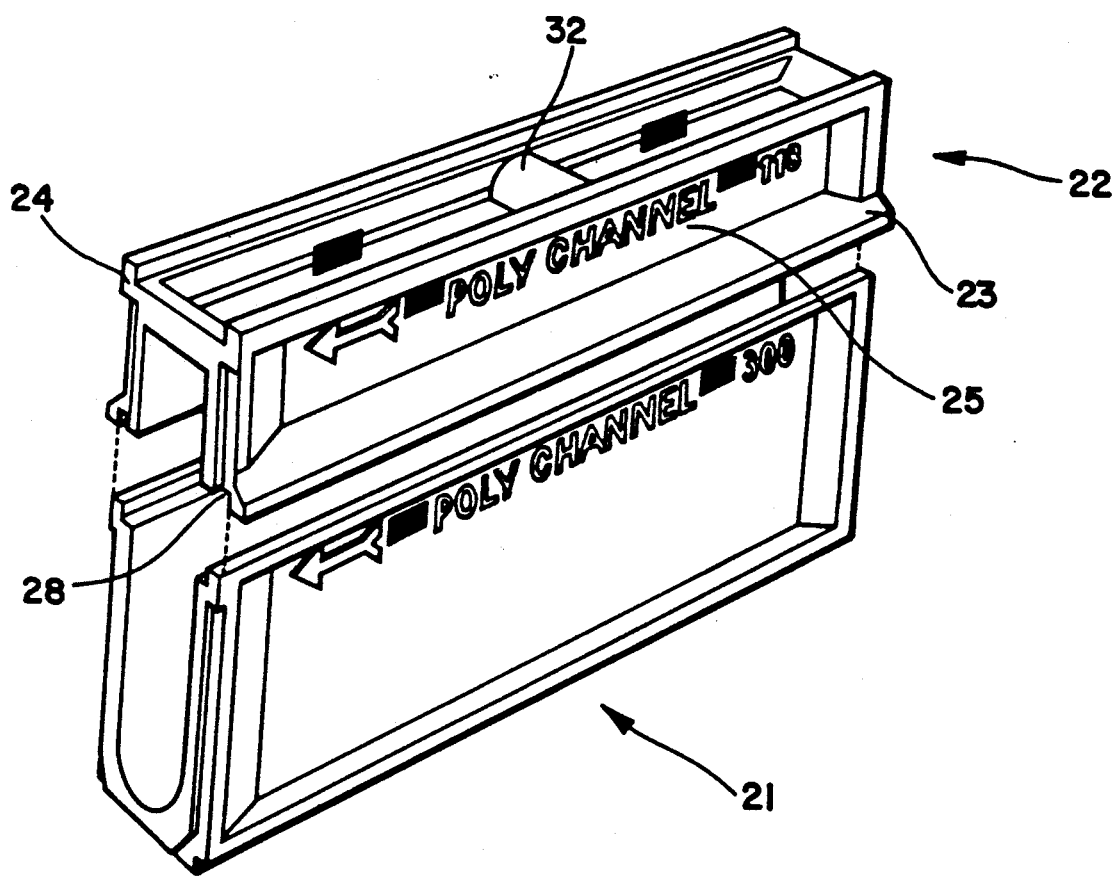
FIG. 6 is a perspective view of a length of drainage channel with a sidewall extension member according to the invention in position to be placed on top of the drainage channel.

The variant of a mounting frame 40 shown in FIG. 4 has, for example, a number n of bars at intervals with a length of $2 \times X$, whereby the first and last bars are at an interval X from the corresponding end of the channel body with a length of $L = 2 \times X \times n$, all bars having the same cross-section in this case. In contrast, the formula $L = 2 \times X \times (n-1)$ applies for a channel body according to FIG. 3, the end bars being half-bars. In practice, good results can be achieved with only two bars (FIG. 4) or three bars (FIG. 3). The channel bodies 21 according to FIG. 2 can be produced as standard components and assembled into channel strands. The individual channel bodies can have a nominal diameter of 10 cm and, as shown in FIG. 5, a gradient of tan $w = k$. FIG. 5 shows four channel bodies A1, B, C, A2, only A1 and A2 being the same. The mounting frames M1, M2, M3, M4, and M5 mounted thereon ae are all the same, however. The two mounting frames M4 and M5 are mounted one over the other on the channel body A2. When H is the height of the mounting frame and h is the height of the smallest channel body A1, the formula used is $$n \times L \times \tan w + h = h + H$$

where n is the number of channel bodies in a group such as A1, B, C and L is the length of a channel body. This results in the formula $$H = n \times L \times \tan w = HM - Hm$$

where HM is the maximum height of the channel body C and $Hm = h$.

The advantage of the invented mounting frame is that the width b of the grating is relatively small compared to a grating for a drainage channel according to the art. Since the volume of the grating is proportional to $b^2$ for a given deflection and a given load, there is considerable material savings in grating production with similar hydraulic properties.

There is a problem, however, in the fabrication of the invented mounting frame with grooves 28, which are not easy to produce in die casting processes. In order to overcome this difficulty, a two-stage process can be used. In the first step, the mounting frame is die cast with full expansions 23; immediately thereafter, the grooves 28 are hollowed out of the expansions 23 in the second step.

The mounting frames can, as the channels, be provided with male and female connections.

The mounting frame can, for example, be made of synthetic resin concrete (thermosetting plastics) or of a commercial building material such as polyester concrete, cement concrete or plastic injection moldings, or it can be made in a plastic press process.

We claim:

1. In a drainage channel system of the type characterized by a plurality of drainage channel segments of progressively greater depth adapted to be interlocked end-to-end to provide a below grade gravity feed sloping drainage run of a predetermined length, each of said channel segments comprising a pair of opposing, spaced-apart side walls, a bottom wall connecting said side walls adjacent one end thereof, and a top opening opposite said bottom wall, said side walls and said bottom wall defining a fluid carrying space therebetween and said top opening defining a fluid entrance adapted to receive a grate; the combination therewith of a sidewall extension member comprising:

(a) first and second sidewall extension panels formed of a cementitious material for being positioned on and received and supported by respective side walls of the drainage channel in longitudinally extending alignment therewith, said first and second sidewall extension panels defining a fully unobstructed bottom opening communicating with the top opening of said drainage channel, opposing end openings and an opposing top opening; and (b) first and second spaced-apart crossbars extending across said sidewall extension member from said first sidewall extension panel to said second sidewall extension panel to connect the first and second sidewall extension panels together into a unit.

2. In a drainage channel system according to claim 1, wherein said crossbars are integrally-formed with said first and second extensions panels.

3. In a drainage channel system according to claim 1, wherein the first and second extension panels include a groove integrally-formed in a free end along the length thereof for being mateingly received on the side walls of the drainage channel.

4. In a drainage channel system according to claim 1, wherein said crossbars are substantially contiguous with the top opening of the first and second extension panels and the height of the side.

5. In a drainage channel system according to claim 1, wherein said crossbars define a curved crossbar surface extending between the first and second extension panels.

6. In a drainage channel system according to claim 1, wherein said sidewall extension member is fabricated of synthetic resin concrete.

7. A sidewall extension member for use with a drainage channel system of the type characterized by a plurality of drainage channel segments of progressively greater depth adapted to be interlocked end-to-end to provide a below grade gravity feed sloping drainage run of a predetermined length, each of said channel segments comprising a pair of opposing, spaced-apart side walls, a bottom wall connecting said side walls adjacent one end thereof, and a top opening opposite said bottom wall, said side walls and said bottom wall defining a fluid carrying space therebetween and said top opening defining a fluid entrance adapted to receive a grate; said sidewall extension member comprising a sidewall extension member comprising:

(a) first and second sidewall extension panels formed of a cementitious material for being positioned on and received and supported by respective side walls of the drainage channel in longitudinally extending alignment therewith, said first and second sidewall extension panels defining a fully unobstructed bottom opening communicating with the top opening of said drainage channel, opposing end openings and an opposing top opening; and (b) first and second spaced-apart crossbars extending across said sidewall extension member from said first sidewall extension panel to said second sidewall extension panel to connect the first and second sidewall extension panels together into a unit.

8. A sidewall extension member according to claim 7, wherein said crossbars are integrally-formed with said first and second extensions panels.

9. A sidewall extension member according to claim 7, wherein the first and second sidewall panels include a groove integrally-formed in a free end along the length thereof for being mateingly received on the side walls of the drainage channel.

10. A sidewall extension member according to claim 7, wherein said crossbars are substantially contiguous with the top opening of the first and second extension panels.

11. A sidewall extension member according to claim 7, wherein said crossbars define a curved crossbar surface extending between the first and second extension panels.

12. A sidewall extension member according to claim 7, wherein said sidewall extension member is fabricated of synthetic resin concrete.

* * * * *